United States Patent [19]

Marks et al.

[11] 4,303,103

[45] Dec. 1, 1981

[54] INTERNAL SLEEVE SEAL AND METHOD OF USE

[76] Inventors: Helmuth Marks, Maulbeerallee 54, 1000 Berlin 20; Wilhelm Fischer, Dubrowstrass 4, 1000 Berlin 37, both of Fed. Rep. of Germany

[21] Appl. No.: 25,142

[22] Filed: Mar. 29, 1979

[30] Foreign Application Priority Data

Mar. 31, 1978 [DE] Fed. Rep. of Germany ....... 2814497

[51] Int. Cl.³ ............................................. F16L 55/18
[52] U.S. Cl. .................................. 138/97; 29/402.09; 29/523; 277/207 A; 277/DIG. 2
[58] Field of Search ...................... 277/207 R, DIG. 2; 138/97, 91, 93, 108, 98; 29/402.09, 402.12, 523

[56] References Cited

U.S. PATENT DOCUMENTS

| 3,762,446 | 10/1973 | Tungseth | 138/97 |
| 4,125,089 | 11/1978 | Reusser | 138/97 |

*Primary Examiner*—Robert I. Smith

*Attorney, Agent, or Firm*—O'Rourke & Harris

[57] ABSTRACT

Internal sleeve seal for sealing pipelines by inserting into the pipeline a tube-like collar member of pliable but not necessarily elastic material having locating means preferably in the form of dovetail seals on either end, positioning the seal with two ring cushions of elastic gumlike material located in annular recessed portions on the collar member located on either side of the portion of the pipeline to be sealed, and radially enlarging the collar member at the recessed portions to urge the ring cushions into sealing contact with the interior surfaces of the pipe while confining the ring cushions to the depressions between axially parallel annular surfaces on the collar member defining the recessed portions to effectively seal the pipe between the ring cushions and the portion of the collar member therebetween. Preferably, the ring cushions are attached to the recessed portions by vulcanized portions, and include an annular groove at the outer portion of the ring cushions to minimize contact with the pipeline when positioning the seal.

10 Claims, 2 Drawing Figures

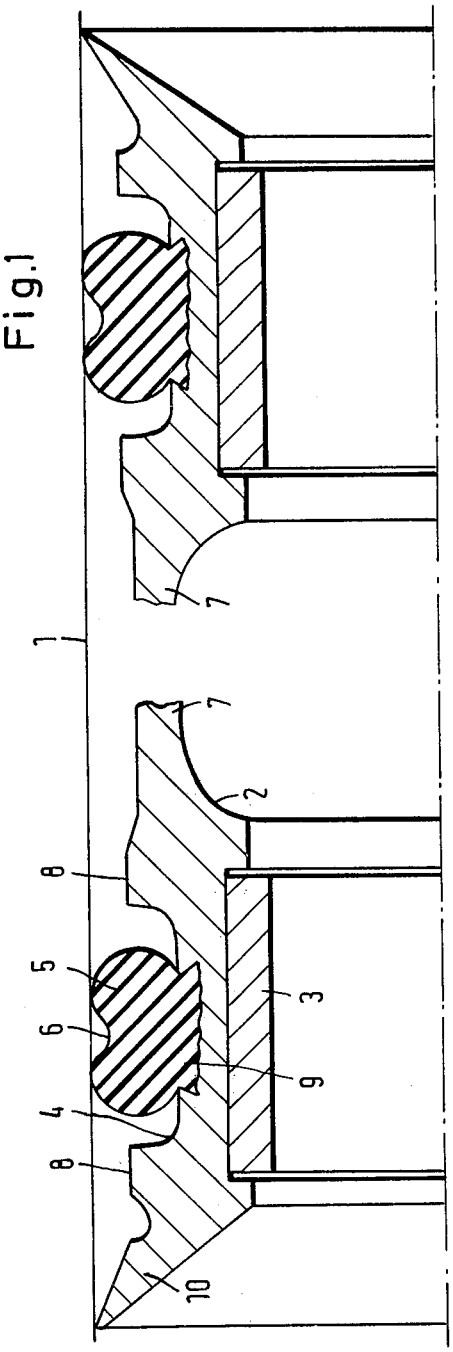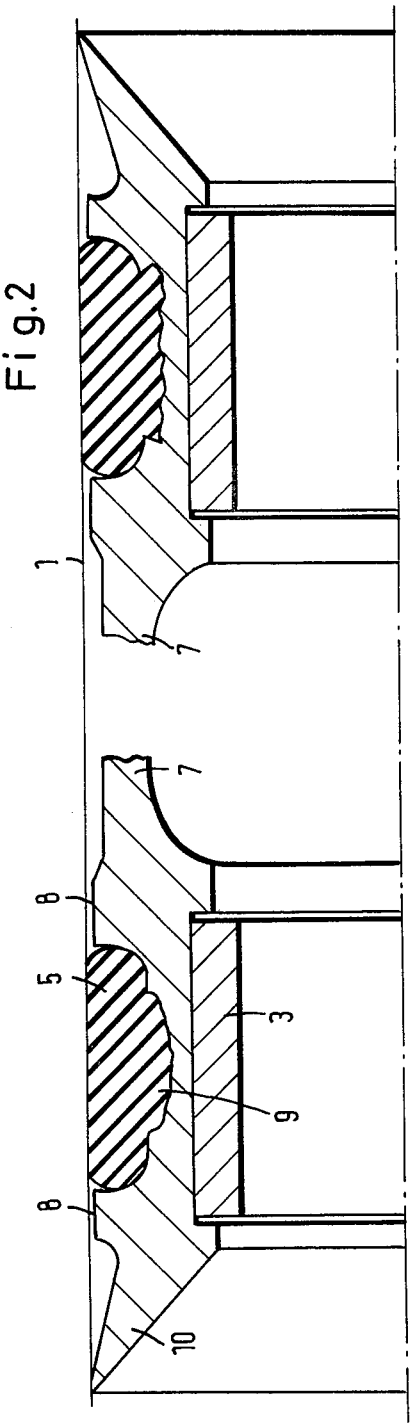

INTERNAL SLEEVE SEAL AND METHOD OF USE

BACKGROUND OF THE INVENTION

1. Field of the Invention

The present invention relates generally to the internal sealing of pipeline joints, and particularly the sealing of inaccessible joints in underground pipelines. Specifically, the present invention relates to an internal seal and method of installation involving a tube shaped, pliable collar member having dovetailed annular locating means defined at opposite ends thereof, and at least two circumferentially recessed portions defined in the collar member and carrying ring shaped cushions of elastic, gumlike material adapted to expand radially in response to expandable tension rings positioned internally of the collar member.

2. Description of the Prior Art

Initial sealing of pipeline joints is conventionally accomplished when the pipeline is laid in individual sections and interfacing joints are sealed by an externally applied seal at the overlapping, adjoining pipe section end portions. However, after prolonged use, it is not unusual for the initially applied seal to develop leaks, thus necessitating resealing of the leaking joints. As will be appreciated, in many instances pipelines are inaccessible for external application of seal. Accordingly, to avoid expensive and inconvenient excavation of pipelines to gain access to the joints which have developed leaks, internal sleeve seals have been developed to facilitate resealing of pipelines internally.

Known internal sleeve seals generally include a tube-like sleeve of an elastic, pliable material which is positioned overlapping the joint, and which is secured in place by ring shaped, radially expandable tension rings which, when expanded, urge the sleeve into sealing relationship against the inner wall of the pipeline at positions adjacent either side of a leaking joint. However, as a result of variations in pipeline roundness, diameter and other tolerance variations, as well as dynamic displacement of the pipeline itself, severe sealing requirements are imposed upon such internal sleeve seals. Known internal sleeve seals conventionally include dovetail like expanding annular spacers protruding from the outer lateral surface thereof, the seals being located at intervals adjacent the tension rings. Thus the seals adjacent the tension rings serve to accommodate variations, either static or dynamic, in the pipeline as a result of the substantial elastic distortion provided by the seal. The stringent requirements of such seals have resulted in high material and manufacturing costs. Further, materials which are particularly adapted to provide an excellent sealing interface with a pipeline generally do not possess sufficient structural strength to adequately seal against migration of, for instance, water from the surrounding environment through the pipeline seal. For this reason, it is often necessary that such known internal sleeve seals be produced with a reinforcing liner to provide sufficient structural strength which is not provided by the highly elastic sleeve sealing material alone.

SUMMARY OF THE INVENTION

The present invention, which provides a heretofore unavailable sleeve seal structure and method includes a tube shaped pliable collar member of sufficient strength to afford sealing against external hydrostatic pressure, and which concurrently is of a more economical material. The collar serves to carry at least two radially expandable tension rings positioned internally of the collar and adjacent recesses defined in the collar by axially spaced parallel annular surfaces, the recessed portion carrying a ring cushion of elastic gumlike material particularly adapted to provide a sealing contact with the interior of the pipeline and which is, preferably, attached to the collar by a vulcanized area therebetween. Dovetail locating means extending radially from the collar member at the end portions thereof are provided to engage the inner surface of the pipeline during movement and thus minimize contact between the ring cushion material, and to also afford some sealing when the tension ring means are expanded. However, primary sealing is provided by urging the ring cushion of elastic gumlike material into sealing contact with the interior of the pipeline by expansion of the tension ring means.

Accordingly, an object of the present invention is to provide a new and improved internal sleeve seal and method which utilizes a collar member formed of a material capable of withstanding high pressures while concurrently being more economical and readily produced.

Another object of the present invention is to provide a new and improved internal sleeve seal and method which utilizes localized ring cushions of highly elastic, gumlike material contained within a recess of the collar member, the gumlike material being readily positioned within a pipeline as a result of the recessed location in the collar member, and thereafter urged into sealing relationship with the interior of the pipeline as a result of radial expansion of tension ring means and containment between axially spaced parallel annular members defining the recess in which the ring cushion of elastic gumlike material is carried.

These and other objects of the present invention will become apparent from the following drawings and description.

BRIEF DESCRIPTION OF THE DRAWINGS

In the drawings:

FIG. 1 is a partial longitudinal section of the internal sleeve seal of the instant invention configured for insertion and positioning in a pipeline; and FIG. 2 is a section view similar to that of FIG. 1 illustrating the internal sleeve seal in the sealing configuration with a pipeline. Detailed Description of th

DETAILED DESCRIPTION OF THE INVENTION

Turning now to the drawings, wherein like components are designated by like reference numerals throughout the two FIGURES, an internal sleeve seal in accord with the instant invention is illustrated in both FIGS. 1 and 2. As illustrated, an inner pipe wall 1 is shown with a collar member 2 positioned adjacent thereto. It will be understood of course that, though illustrated in section, the collar member 2 is substantially circular in cross-section and accordingly maintains a substantially constant relationship with inner pipe wall 1 around the circumference thereof.

Tube shaped collar member 2 is formed of a pliable material, which is not necessarily of a high elasticity, but which is sufficiently strong to obviate the need for additional reinforcement to provide sealing integrity against hydrostatic pressures which may develop inside inner pipe wall 1. Such materials tend to be more economically processed and lower in cost than materials utilized with conventional internal sleeve seals. Preferably adjacent each end of collar member 2 a tension ring means 3 is carried internal of collar member 2. Such tension ring means 3 are, in themselves, known to the art and are radially expandable in response to external manipulation. At the outer surface of collar member 2, and at the positions corresponding to tension ring means 3, annular recesses 4 are defined and adapted to carry a ring cushion 5 of elastic gumlike material. Such elastic gumlike material is generally of a more expensive composition, and adapted to have substantial elasticity and sealing characteristics. Preferably, a beadlike recess 6 is defined at the central circumference of ring cushion 5.

As illustrated, collar member 2 includes an extended middle section 7, shown in a discontinuous fashion, which serves as a tubular sealing portion between the ring cushions 5. A pair of spaced, axially parallel annular surfaces 8 are defined adjacent each ring cushion 5 at the exterior of collar member 2. Annular surfaces 8 thus serve to define annular recess 4. Preferably, each ring cushion 5 is secured within corresponding annular recess 4 by vulcanized area 9 at the interface therebetween. However, other means of attachment are of course operable. Dovetail annular locating means 10 are defined on each end of collar member 2 to initially locate collar member 2 relative to inner pipe wall 1, and ultimately to assist in sealing between collar member 2 and inner pipeline wall 1.

In operation, as shown in FIG. 1, collar member 2 is located adjacent inner pipeline wall 1 by dovetail locating means 10. In such configuration, ring cushion 5 of elastic gumlike material is only in light contact with, or even spaced from, inner pipe wall 1. Accordingly, when in the configuration illustrated in FIG. 1, collar member 2 may be axially moved within a pipeline and positioned with at least one ring cushion 5 of elastic gumlike material on either side of a leaking pipeline joint (not shown).

When, as shown in FIG. 2, tension ring means 3 is radially expanded in a known manner to urge ring cushion 5 into sealing engagement with inner pipe wall 1, an effective seal is provided at a leaking pipeline joint (not shown). As shown particularly well in FIG. 2, parallel annular surfaces 8 serve to contain ring cushion 5 within annular recess 4, while circumferential beadlike depression 6 in ring cusion 5 serves to improve the sealing relationship and distribution of elastic gumlike material of ring cushion 5. When configured in the sealing relationship shown in FIG. 2, dovetail annular locating means 10 serves as a seal between collar member 2 and inner pipeline wall 1, though compressed ring cushion 5 serves as the primary sealing interface. Since collar member 2 is formed of a strong material as a result of avoidance of a requirement for great elasticity, middle section 7 of collar member 2 is sufficiently strong to seal against infiltration of water or other exterior foreign materials, particularly in the instance in which the pipeline interior is not under pressure, and thus obviates the need for a reinforcing sleeve.

In summary, the instant invention provides for the sealing of pipelines by means of an internal sleeve seal in which ring cushions of elastic gumlike material are provided at spaced annular depressions on the surface of a tube like collar member. Radially expandable tension ring means are provided to urge the elastic gumlike material into sealing engagement with the inner wall of a pipeline when the collar member is appropriately positioned. The collar member includes annular surfaces to maintain the elastic gumlike material within the depression. In such a manner a low cost sleeve seal is provided. Since the collar member may be produced of cheaper and stronger material which need only be pliable, but need not have a modulus of elasticity such as is required of the ring cushion material, the resulting structure is not only more effective, but also more economical.

In view of the wide use to which the present invention may be put, only limited embodiments of the invention have been described for purposes of illustration. It is, however, anticipated that various changes and modification will be apparent to those skilled in the art, and that such changes and modifications may be made without departing from the scope of the invention as defined by the following claims.

We claim:

1. An internal sleeve seal for sealing a localized discontinuity in a pipeline, the seal comprising, a tube-shaped pliable collar member having annular locating means defined thereon adjacent the end portions thereof, the locating means being adapted to extend radially outward to engage the interior surface of a pipeline, at least two recessed portions defined circumferentially around the collar at axially spaced positions and between the locating means, a ring cushion of elastic, gumlike material positioned in each recessed portion, and means to radially expand the collar member at the recessed portions, whereby, the collar member may be moved axially through the pipe with the locating means engaging the interior of the pipe and positioned at the discontinuity to be sealed with a ring cushion positioned substantially within the recessed portions on either side of the discontinuity, whereupon the collar may be radially expanded at the recessed portions to urge the ring cushion into contact with the interior of the pipeline while containing the ring cushion within the associated recessed portion to seal the discontinuity.

2. An internal sleeve seal as set forth in claim 1 in which each ring cushion is attached at a portion thereof to the surface of the recessed portion in which it is positioned.

3. An internal sleeve seal as set forth in claim 2 in which the ring cushion is attached to the recessed portion by vulcanization therebetween.

4. An internal sleeve seal as set forth in claim 1 in which each ring cushion has defined therein an annular groove at the outermost portion thereof.

5. An internal sleeve seal as set forth in claim 1 in which the portions of the collar member adjacent each depressed portion thereof are axially parallel annular surfaces adapted to engage the interior of the pipeline and confine the ring cushion therebetween.

6. An internal sleeve seal for sealing joints in a pipeline, the seal comprising, a tube-shaped, pliable collar member having dovetail annular locating means defined thereon at the end portions thereof, the dovetail locating means extending radially outward from the collar member and being adapted to engage the interior surface of a pipeline, at least two circumferentially recessed portions defined in the collar member at axially spaced locations thereon and between the locating means, the recessed portions each being defined at the adjacent collar portions thereof by axially parallel annular member surfaces of the collar member;

a ring cushion of elastic gumlike material positioned in each recessed portion and attached thereto by vulcanized areas, and tension ring means positioned internally of the collar member at the recessed portions, and adapted to be expanded radially outward.

7. A method of internally sealing discontinuities in a pipeline, the method comprising:

moving a tube-shaped, pliable collar member having annular locating means defined thereon at the adjacent end portions through a pipeline, positioning two ring cushions of elastomeric gumlike material located in recessed portions defined in the collar member at axially spaced positions on either side of the pipeline discontinuity, expanding tension ring means within the collar member radially outward at the recessed portions to urge the ring cushions into sealing contact with the internal surface of the pipeline to form a sealing volume adjacent the discontinuity and between the ring members and the collar member, and substantially containing each ring cushion within the recessed portions of the seal with the ring cushions urged against the pipe surface.

8. A method of internally sealing a pipeline as set forth in claim 7 in which the ring cushions are confined to the recessed portions after radially expanding the depressed portions by axially parallel annular surfaces defined on the collar member adjacent either side of each recessed portion.

9. A method of internally sealing a pipeline as set forth in claim 7 in which the pipeline discontinuity to be sealed comprises a pipejoint between adjacent sections of pipe.

10. A method of internally sealing a pipeline as set forth in claim 7 in which each ring cushion includes an annular groove defined therein at the outermost portion thereof.

* * * * *